(12) United States Patent
Kuo et al.

(10) Patent No.: US 10,015,275 B2
(45) Date of Patent: Jul. 3, 2018

(54) METHOD FOR AUTOMATICALLY MANAGING APPLICATIONS ON DIGITAL CONVERGENCE GATEWAYS, AND APPLICATION DEVICE AND SYSTEM THEREOF

(71) Applicant: Industrial Technology Research Institute, Hsinchu (TW)

(72) Inventors: Wen-Hsing Kuo, Taichung (TW); Tein-Yaw Chung, Taoyuan (TW); Yian-Shu Chu, New Taipei (TW); Lyu-Han Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 173 days.

(21) Appl. No.: 14/967,391

(22) Filed: Dec. 14, 2015

(65) Prior Publication Data

US 2016/0285920 A1  Sep. 29, 2016

(30) Foreign Application Priority Data

Mar. 23, 2015  (TW) .............................. 104109131 A

(51) Int. Cl.
  *G06F 15/173* (2006.01)
  *H04L 29/08* (2006.01)
  *H04W 4/50* (2018.01)
  *H04W 4/80* (2018.01)
  *H04W 4/00* (2018.01)

(52) U.S. Cl.
  CPC .......... *H04L 67/303* (2013.01); *H04W 4/001* (2013.01); *H04W 4/008* (2013.01); *H04W 4/50* (2018.02); *H04W 4/80* (2018.02)

(58) Field of Classification Search
  CPC ...... H04L 67/303; H04W 4/008; H04W 4/001
  See application file for complete search history.

(56) References Cited

U.S. PATENT DOCUMENTS 6,990,379 B2  1/2006 Gonzales et al.
7,479,875 B2  1/2009 Fehling et al.
(Continued)

FOREIGN PATENT DOCUMENTS

CN  101171804  2/2013
CN  203261357  10/2013
(Continued)

OTHER PUBLICATIONS

Caldeira et al., "Toward ubiquitous mobility solutions for body sensor networks on healthcare," IEEE Communications Magazine, May 2012, pp. 108-115.
(Continued)

*Primary Examiner* — Richard G Keehn
(74) *Attorney, Agent, or Firm* — JCIPRNET

(57) ABSTRACT

In an embodiment, a method comprises installing at least one application in a gateway, wherein the gateway is an anchor gateway and the at least one application corresponds to a profile; generating, by the anchor gateway, a gain value of the at least one application according to the profile; and determining, according to the gain value, whether to open or close the at least one application, or whether the at least one application is executed in the gateway or in another gateway. An application managing device and a system thereof are also provided.

18 Claims, 15 Drawing Sheets

(56) References Cited

U.S. PATENT DOCUMENTS

| | | | |
|---|---|---|---|
| 7,949,755 | B2 | 5/2011 | Katoh et al. |
| 8,205,240 | B2 | 6/2012 | Ansari et al. |
| 8,281,010 | B2 | 10/2012 | Ansari et al. |
| 8,369,326 | B2 | 2/2013 | Ansari et al. |
| 8,543,665 | B2 | 9/2013 | Ansari et al. |
| 2001/0044910 | A1* | 11/2001 | Ricart ............... G06F 11/1458 714/6.12 |
| 2003/0040813 | A1 | 2/2003 | Gonzales et al. |
| 2006/0140205 | A1 | 6/2006 | Baik et al. |
| 2008/0069088 | A1* | 3/2008 | Petrovic ............... H04W 36/22 370/354 |
| 2010/0091653 | A1* | 4/2010 | Koodli ............... H04W 36/0027 370/235 |
| 2013/0041997 | A1 | 2/2013 | Li et al. |
| 2013/0091208 | A1 | 4/2013 | Rajakarunanayake et al. |

FOREIGN PATENT DOCUMENTS

| | | |
|---|---|---|
| TW | 200412175 | 7/2004 |
| TW | 201025948 | 7/2010 |
| TW | 201117120 | 5/2011 |
| TW | M432900 | 7/2012 |

OTHER PUBLICATIONS

Chen et al., "Digital Home Networking and Services with OSGi Platform," International Conference on New Trends in Information and Service Science, Jun. 30-Jul. 2, 2009, pp. 372-377.

Mao et al., "Solution to intelligent management and control of digital home," 3rd International Conference on Biomedical Engineering and Informatics (BMEI), Oct. 16-18, 2010, pp. 2962-2965.

Yang et al., "A Cloud Architecture Based on Smart Home," Second International Workshop on Education Technology and Computer Science (ETCS), Mar. 6-7, 2010, pp. 440-443.

Wang et al., "A Controllable C/S/C (Customer/Server/Client) Network Model for Digital Home Applications," International Conference on Web Information Systems and Mining, Nov. 7-8, 2008, pp. 719-723.

Cetina et al., "Autonomic Computing through Reuse of Variability Models at Runtime: The Case of Smart Homes," Computer, Oct. 2009, pp. 37-43.

Lee et al., "Design and implementation of baby-care service based on context-awareness for digital home," The 7th International Conference on Advanced Communication Technology, Feb. 21-23, 2005, pp. 908-911.

Huang et al., "Using Touchable Tabletop as Unified Control Platform in Digital Home," Fourth International Conference on Digital Home (ICDH), Nov. 23-25, 2012, pp. 421-425.

Oliveira et al., "Implementing home care application in Brazilian Digital TV," Global Information Infrastructure Symposium, Jun. 23-26, 2009, pp. 1-7.

Wang et al., "A "Try before you buy" approach for networked digital home appliances and services," Digest of Papers International Conference on Consumer Electronics, Jan. 10-14, 2009, pp. 1-2.

Wu et al., "M2M: From mobile to embedded internet," IEEE Communications Magazine, Apr. 2011, pp. 36-43.

Gluhak et al., "A survey on facilities for experimental internet of things research," IEEE Communications Magazine, Nov. 2011, pp. 58-67.

Digital Living Network Alliance Organization, the website of DLNA organization availabe at: http://www.dlna.org/about/organization, retrieved on Dec. 14, 2015.

Radio Frequency IDentification, the online tutorial of RFID, available at: http://www.connect802.com/rfid_facts.htm, retrieved on Dec. 14, 2015.

Vidanagama et al., "M2M gateway selection scheme for smart wireless devices," 18th International Conference on Intelligence in Next Generation Networks (ICIN), Feb. 2015 , pp. 176-183.

Chen et al., "A brief introduction to IoT gateway," IET International Conference on Communication Technology and Application (ICCTA 2011), Oct. 14-15, 2011, pp. 610-613.

"Office Action of Taiwan Counterpart Application", dated May 16, 2016, p. 1-9, in which the listed references were cited.

* cited by examiner

METHOD FOR AUTOMATICALLY MANAGING APPLICATIONS ON DIGITAL CONVERGENCE GATEWAYS, AND APPLICATION DEVICE AND SYSTEM THEREOF

CROSS-REFERENCE TO RELATED APPLICATION

This application claims the priority benefit of Taiwan application serial no. 104109131, filed on Mar. 23, 2015. The entirety of the above-mentioned patent application is hereby incorporated by reference herein.

TECHNICAL FIELD

The technical field relates to a method for automatically managing applications on digital convergence gateways, and an application managing device and a system thereof.

BACKGROUND

In recent years, the advances of the information technology greatly influence people's works, interactions in the community, and even life styles. In addition, hardware devices such as wireless sensor, tablet computer, smart phone, digital camera, and various computer equipment, are popular over the world. With the advances of the wireless communication technology and the info nation technology, various kinds of internet technologies are also being developed, wherein the technologies of M2M (Machine to Machine), IOT (Internet of Things), or DLNA (Digital Living Network Alliance) may make people feel more convenient and enjoyable when using the information technology. Therefore, wearable devices managing physical conditions and digital home technologies managing and sensing houses become main stream.

In the current digital convergence technologies, service providers or device manufactures may provide specific applications (for example, home security, health care, etc.) corresponding to their products, while a user executes a specific application on a specific gateway in a specific condition. FIG. 1A shows a schematic diagram of a digital convergence system 100. Referring to FIG. 1A, the system 100 includes three main parts: devices, gateways, and applications (APPs). Take an example, the devices 101-106 may include kinds of home devices in a digital home environment (for example, smart appliances, sensors, etc.), personal portable devices, or wearable devices (for example, smart glasses, watches, etc.). The gateways (for example, home gateway or mobile gateway) may be configured to connect to or communicate with the devices (for example, the home devices and the wearable devices as mentioned above) in a same networks to use the functions of the devices to execute different applications. For example, the devices 101-104 may obtain different applications via a home gateway 110, while the devices 105-106 may obtain different applications via a mobile gateway 120. The applications (APPs) 132-138 may be specific applications, which may be executed by specific devices, or provided by service providers or device manufactures. The APPs 132-138 may be configured to manage a plurality of devices (for example, devices 101-106), interact with environments, and obtain data of relative operating environments. The data may also be transmitted to service providers 142-148 in the clouds via the APPs 132-138.

In this architecture, all of the service providers or the device manufactures may provide specific applications (for example, home security, health care, etc.) corresponding to the products (for example, services or devices) of the service providers or the device manufactures. A user may execute a specific application in a specific gateway under a specific condition or situation. However, it is difficult to control and manage the applications and/or the devices when the number of the devices and the applications are increased. In the following, several examples are used to explain this kind of situation. In one example, assume that an old person is not at home, and the old person wears a heart rate measuring device connecting a cell phone to execute a nursing service application. In addition, a home set-top box (STB) connects an internet protocol camera (IP CAM) to execute a security service application. The following situations may occur. (1) Security service: When the old person come back home, the security service application needs to be closed to avoid triggering the alarm. When the old person leaves home, the security service application needs to be opened to detect the situations inside the house. It is inconvenient for each family member to do these actions. (2) Nursing service: When the old person come back home, the execution of the nursing service application may be transferred from the cell phone to the home STB, and the devices connected to the home STB may also be used. In this way, the connection cost and the power consumption of the cell phone may be saved. When the old person leaves home, the execution of the nursing service application should be transferred to the cell phone because there is no connection between the heart rate measuring device and the home STB. Whenever the old person leaves and come back home, the old person needs to open and close two applications on two gateways, which is very inconvenient to the old person.

In another example, when a person visits a public exhibition center (e.g. a museum), there is no information in the cell phone of the person to know that an available guiding service (e.g. multimedia guide) application may be executed. Therefore, the person requires to establish a connection between the cell phone and the gateway of the public exhibition center manually and download guiding applications for different areas according to different conditions.

The context awareness technique is widely used in digital convergence. By using the context awareness technique, the information needed by a user may be transmitted to a location where the user may use the information, according to different geography or environments. According to factors of the situations, proper information may be provided via a sensor. The context awareness technique may be implemented under a wireless network environment. FIG. 1B is a schematic diagram of using a home gateway 110 to describe managing all devices on the home gateway 110 according to various conditions. The devices 101-103 provide suitable information via a context aware service application 112 of the home gateway 110, and obtain different service applications from different servers 150 via a service provider 142 in the cloud. Different service applications may be provided according to different environmental conditions. However, each of specific service applications is provided by each of the different manufactures.

When the number of the devices and applications increases, it become difficult to manage and control well. Therefore, it is needed to provide a method to consider the cooperation and the communication between gateways to improve the execution benefit and lower the costs, so as to achieve demands of the digital home automation.

SUMMARY

One of exemplary embodiments relates to a method for automatically managing applications on digital convergence gateways. The method comprises: installing at least one application in a gateway, wherein the gateway is an anchor gateway and the at least one application corresponds to a profile; generating, by the anchor gateway, a gain value of the at least one application according to the profile; determining, according to the gain value, whether to open or close the at least one application, or whether the at least one application to be executed in the anchor gateway or in an another gateway.

One of exemplary embodiments relates to an application managing device for automatically managing applications on digital convergence gateways. The application managing device includes a processor and a memory. The processor executes a plurality of modules and the memory stores data or information for executing the plurality of modules. The plurality of modules include an application (APP) manager, a device manager, and a stage monitor. The APP manager calculates a gain value of at least one application installed in the application managing device to determine whether to open or close the at least one application or whether the at least one application to be executed in the application managing device or an another gateway. The device manager senses a device connected to the application managing device to obtain a sensed value of the device. The stage monitor examines whether a state of the at least one application is changed, and informs the APP manager to calculate the gain value of the at least one application when the state is changed.

One of exemplary embodiments relates to a system for automatically managing applications on digital convergence gateways, which is adapted to a plurality of gateways. In the system, there is an anchor gateway of the plurality gateways. The anchor gateway comprises an APP manager, a device manager, and a stage monitor. The APP manager calculates a gain value of an application installed in the anchor gateway to determine whether to open or close the at least one application or to determine one of the plurality of gateways to execute the at least one application. The device manager senses a device connected to the anchor gateway to obtain a sensed value of the device. The stage monitor examines whether a state of the at least one application is changed, and informs the APP manager to calculate the gain value of the at least one application when the state is changed.

The foregoing will become better understood from a careful reading of a detailed description provided herein below with appropriate reference to the accompanying drawings.

DETAILED DESCRIPTION OF DISCLOSED EMBODIMENTS

Figure 1A:
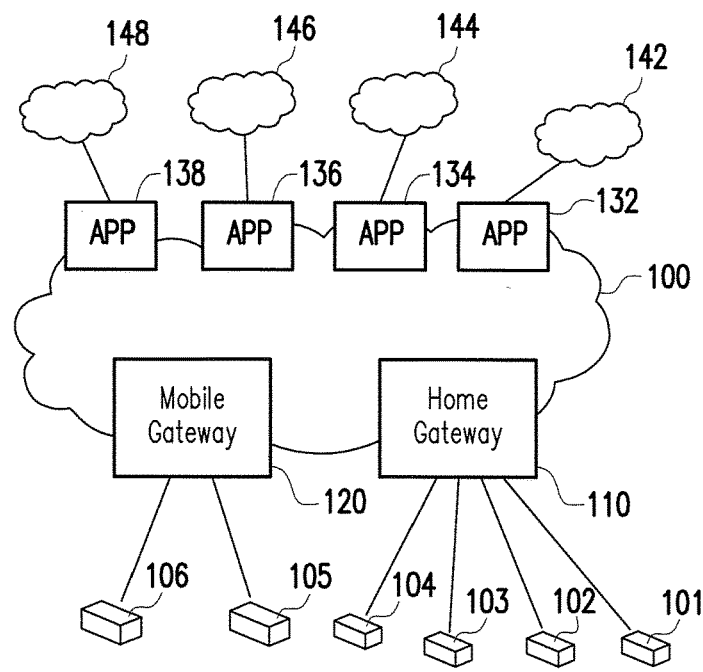
FIG. 1A shows a schematic diagram of a digital convergence system.
Figure 1B:
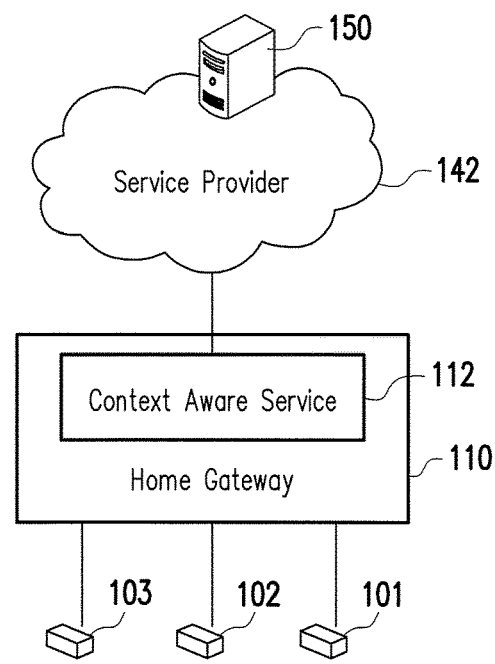
FIG. 1B is a schematic diagram of using a home gateway to describe managing all devices on the home gateway according to various conditions.

Below, exemplary embodiments will be described in detail with reference to accompanying drawings so as to be easily realized by a person having ordinary knowledge in the art. The inventive concept may be embodied in various forms without being limited to exemplary embodiments set forth herein. Descriptions of well-known parts are omitted for clarity, and like reference numerals refer to like elements throughout.

A method, a system, and an application managing device for automatically managing applications on digital convergence gateways are provided in the exemplary embodiments of the disclosure. A plurality of gateways may cooperate, interconnect and communicate with each other to meet the demands of digital home automation. In the method and the system provided in the embodiments of the disclosure, at least one application is opened or closed, and/or transferred between gateways automatically according to different conditions. By managing the applications, the gateways communicate and cooperate with each other. This may improve the execution benefit, lower the costs, and accomplish the trend of the digital home automation.

According to some embodiments of the disclosure, an architecture supporting one or more existing main parts of the digital convergence system is provided. Also, the applications may be transferred between gateways, such that execution benefits may be achieved substantially and the applications may be used properly. In the architecture, various applications may be opened or closed, and/or transferred between different gateways (for example, personal gateways, home gateways, etc.) automatically, according to various conditions. The application providers may provide specific applications without considering the issues of automatic transfer, and applications may be transferred automatically to avoid the executing conditions of the applications being watched all the time. This makes the digital home automation become more humane, and the digital home automation may be evolved into the personal local cloud.

According to an embodiment of the disclosure, a setting phase, an installing phase, and an operating phase may be performed in a system for automatically managing applications. Setting of a profile of at least one application to be executed or used is done in the setting phase. Then, in the installing phase, the at least one application is installed into an anchor gateway and the profile of the at least one application is registered in the anchor gateway. Once an authorized gateway joins in or appears, the anchor gateway and the authorized gateway may communicate with each other and constitutes an interconnection. And, the anchor gateway may transmit profiles of different applications to the authorized gateway, such that external devices may use the applications automatically by switching the gateways. In the operating phase, the gateways may manage the applications according to algorithms or rules to obtain such as a gain value, etc.

In some embodiments of the disclosure, the design of the system for automatically managing applications may be based on economics, such as one or more gain values in economics are introduced. When a gateway executes an application, a gain value at a time is obtained by subtracting a cost value (CV) from a utility value (UV). The application may be transferred between various gateways automatically. In one embodiment, the gateway having a largest gain value may be selected to execute the application. In another embodiment, when the gain value is smaller than a predetermined value or is equal to zero, the application may be closed in the gateway. Therefore, this application may be opened or closed, or transferred to another gateway automatically according to various conditions.

During the setting phase for a platform initialization in the system for automatically managing applications, profiles of various applications may be provided to an APP manager of a gateway, wherein the APP manager is responsible for mainly controlling the applications. This gateway is referred as an anchor gateway. In one embodiment, information included in a profile of at least one application may be, but not limited to the following information of anchor gateway, mainly executing the application; authorized gateway, being authorized to execute the application when connecting to the anchor gateway; device requirements (mandatory or optional); and parameters of the utility value and the cost value. According to the profile, for example, the information of the anchor gateway, the authorized gateway, and the gain values of a gateway may be obtained, wherein the gateway may execute the application in different conditions, and these gain values in the different conditions may be obtained by subtracting the cost values from the utility values in the different conditions. The profile of each of the applications may be provided by an application provider, predetermined by the platform, or configured by the user.

In embodiments of the system for automatically managing applications on digital convergence gateways, the utility value of an application executing in a gateway may be calculated. Also, the utility value of the application may be determined according to any of combinations chosen from a system condition, a number of devices connected to the anchor gateway and an authorized gateway. And, whether an additional utility value is added may be optional. The utility value (UV) may be, but not limited to, calculated by the following equation (1).

$$UV = X1(S) \times X2(D)[K1 + \Sigma_{d=2}^{N} K_d(D)] \qquad (1).$$

In equation (1), S represents current system conditions, wherein S may be, but not limited to the connecting status between gateways (for example, whether the cell phone connects the home gateway) and the current sensed values of devices (for example, time, temperature, quick response (QR) code. D represents devices currently connected to the gateway. K1 represents a basic utility value. $K_d$ represents the additional utility value, which is a bonus item. X1(S) represents a Boolean function which determines whether the application is appropriate for the current system conditions S. For example, setting X1(S) to 1 indicates it is appropriate to execute the application in the current system condition, while setting X1(S) to 0 indicates it is not appropriate to execute the application in the current condition (for example, power consumption is too large). X2(D) represents another Boolean function which determines whether there is an available device connected to the gateway to execute the application or not. In other words, this Boolean function X2(D) determines whether the application may be executed or not, or determines whether there is a way to execute the application or not. For example, setting X2(D) to 1 indicates there is an available device on the gateway to execute the application, while setting X2(D) to 0 indicates there is no available device on the gateway to execute the application. In equation (1), when X1(S) is 1 and there is an available device on the gateway to execute the application (i.e. X2(D) is 1), the utility value at least has the basic utility value K1. When there are one or more additional available devices on the gateway to execute or assist to execute the application, more additional utility values K2(D)-KN(D) may be added onto the gateway.

In embodiments of the system for automatically managing applications, the cost value of an application executed by a gateway may be calculated. In one embodiment, the cost value (CV) may be, but not limited to, calculated by the following equation (2).

$$CV = \sum_{t=1}^{T} W_t \sum_{i=0}^{N} C_{i,t}. \qquad (2)$$

In equation (2), t represents a kind of a cost (for example, communication, power, depreciation). $W_t$ represents a weighting of a cost of the $t^{th}$ kind. $C_{i,t}$ represents the cost of the $t^{th}$ kind of a $i^{th}$ equipment. T represents a total number of different kinds (for example, communication, power, depreciation) of a cost. N represents a total number of the equipments. Therefore, the cost value of an application is the summation of each kind of the weighted costs of the gateway and relative devices for the application. In another embodiment, the weighting factor may be omitted, in other words, the cost value of an application is the summation of each kind of the costs of the gateway and relative devices for the application.

Three phases of the setting phase, the installing phase and the operating phase performed in the embodiments of the system for automatically managing applications on digital convergence gateways have been described as mentioned earlier. Examples are described in the following with appropriate reference to the accompanying drawings.

Figure 2A:
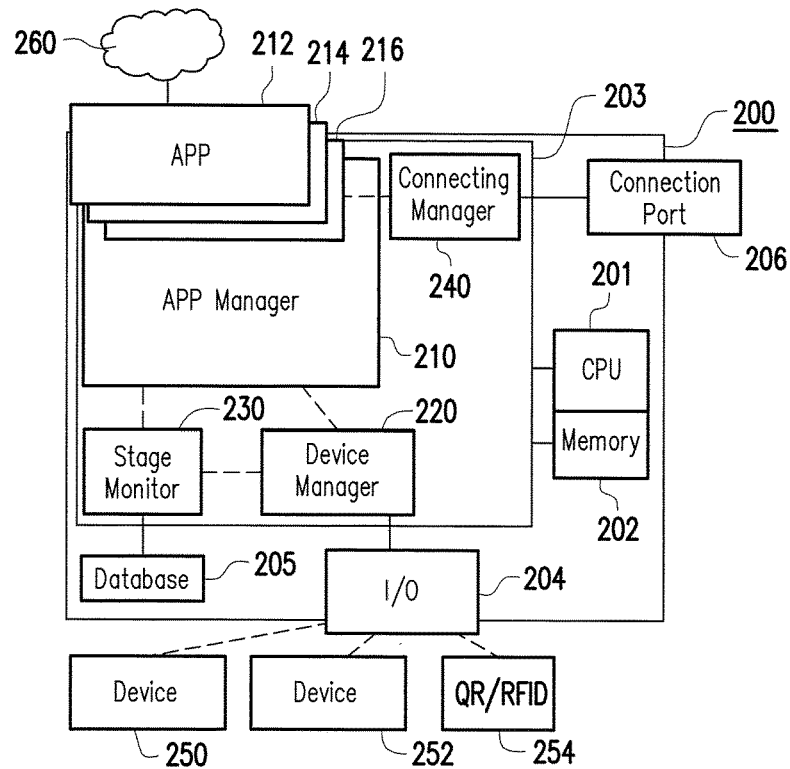
FIG. 2A is a schematic block diagram of a system for automatically managing applications on digital convergence gateways according to one of the embodiments of the disclosure.

FIG. 2A is a schematic block diagram of the system for automatically managing applications on digital convergence gateways according to an embodiment of the disclosure. In the embodiment of FIG. 2A, the system for automatically managing applications may be implemented in an application managing device 200. The application managing device 200 comprises a central processing unit (CPU) 201 and a memory 202. The application managing device 200 may communicate with a remote service provider 260 via a wired or wireless network. The remote service provider 260 may be a server in the cloud. The CPU 201 may be configured to execute a plurality of modules. The memory 202 may be configured to store data or information for executing the plurality of modules. The plurality of modules may include an APP manager 210, a device manager 220 and a stage monitor 230. The device manager 220 may connect an input/output (I/O) port 204, while the stage monitor 230 may connect a database 205. The system for automatically managing applications 203 may be adapted to a plurality of gateways, and in the system, there is an anchor gateway of the plurality of gateways, and the anchor gateway may include an APP manager 210, a device manager 220, a stage monitor 230, and a connecting manager 240. The input/output (I/O) port 204 may further connect to a plurality of devices such as devices 250 and 252, and/or a quick response (QR) or radio-frequency identification device 254 via wired or wireless schemes. These connecting schemes may be, but not limited to QR code, radio-frequency identification (RFID), near field communication (NFC), Wi-Fi, Bluetooth, ultra-wideband (UWB), third Generation (3G), fourth Generation (4G), or ZigBee.

The system for automatically managing applications 203, the APP manager 210, the device manager 220, the stage monitor 230, and the connecting manager 240 shown in the figures are labeled as blocks or modules for convenience to describe their characteristics, so as to show their independencies for implementing their characteristics, respectively. In the implementation, each of these blocks or modules may be implemented by hardware circuits individually or integrally. In an embodiment, these blocks or modules may be implemented by very-large-scale integration (VLSI) circuits, gate arrays, ready-made logic chips, transistors, discrete components, and so on. In another embodiment, these blocks or modules may be implemented in programmable hardware devices such as field-programmable gate array (FPGA), Programmable Array Logic (PAL), programmable logic device (PLD), or the like. Yet in another embodiment, these blocks or modules may be implemented by software which may be executed by various processors.

The APP manager 210 may installs a plurality of applications (APP) in the installing phase. The APP manager 210 may determine whether to open or close one or more applications, or determine gateway(s) to execute the one or more applications. The one or more applications may be provided, but not limited to by the remote service provider 260, or other storage devices or equipment. The one or more applications may access information in the remote service provider 260. Take APPs 212, 214 and 216 shown in FIG. 2A as an example for illustration. In an embodiment, after the APP 212 is installed, the APP manager 210 may calculate the gain value for executing the APP 212 (for example, by subtracting the cost value from the utility value), to determine to open or close the APP 212, or determine a gateway to execute the APP 212. The gain value may be calculated, but not limited to from the utility value and/or the cost value. Any value that may determine the execution of the APP 212 may be adopted for determining the gain value. In an embodiment, the gain value may be calculated according to one or more operation values (OP value) related to the executing environment. The device manager 220 is configured to manage the devices connected to the gateway and the information received by the gateway. The stage monitor 230 obtains one or more sensed values of monitored devices via the device manager 220 to determine a current state of the gateway. The connecting manager 240 is configured to connect other gateways, and transmit or receive currently relative information of the APP 212 to or from other gateways. For example, the utility value and/or the cost value may be used to calculate the gain value in this embodiment, therefore, the connecting manager 240 may connect other gateways (for example, the authorized gateway) and transmits or receives a current utility value and/or a current cost value to or from these other gateways. In another embodiment, the connecting manager 240 may transmits or receives operation values related to the executing environment. The utility value and/or the cost value may be the values as aforementioned. The OP values may be, but not limited to characteristic values or information of the operation date, the operation time, the temperature, the location, the quantity of electricity, current user. The description and the operations of the APP 214 and 216 are similar to those of the APP 212.

Figure 2B:
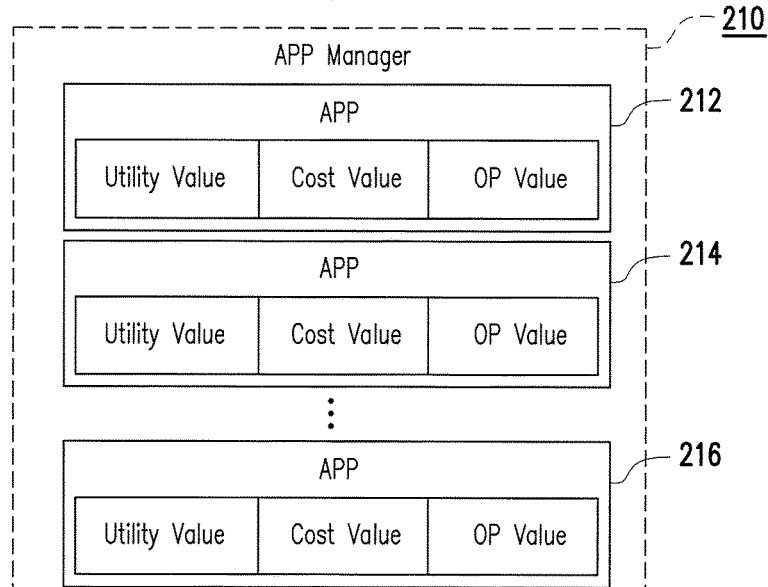
FIG. 2B shows the APP manager and relative information in the system for automatically managing applications according to an embodiment of the disclosure.

FIG. 2B shows the APP manager and relative information in the system for automatically managing applications according to an embodiment of the disclosure, wherein the APP manager is configured to control and manage a plurality of applications and the relative information corresponding to each of the applications. The APP manager 210 controls and manages, for example, the APPs 212, 214, and 216. Each APP may have a corresponding utility value (UV), a corresponding cost value (CV), and/or a corresponding operation value (OP Value). As aforementioned, the APP manager 210 may determine to open or close the APPs, or the gateway(s) to execute the APPs. When an authorized gateway joins in a platform of the system for automatically managing applications, the authorized gateway generates parts or all of UVs, CVs, and/or OP Values of the APPs on the authorized gateway, such that the gain values of the APPs on the authorized gateway may be calculated to determine to open or close the APPs, or the gateway(s) to execute the APPs.

Figure 2C:
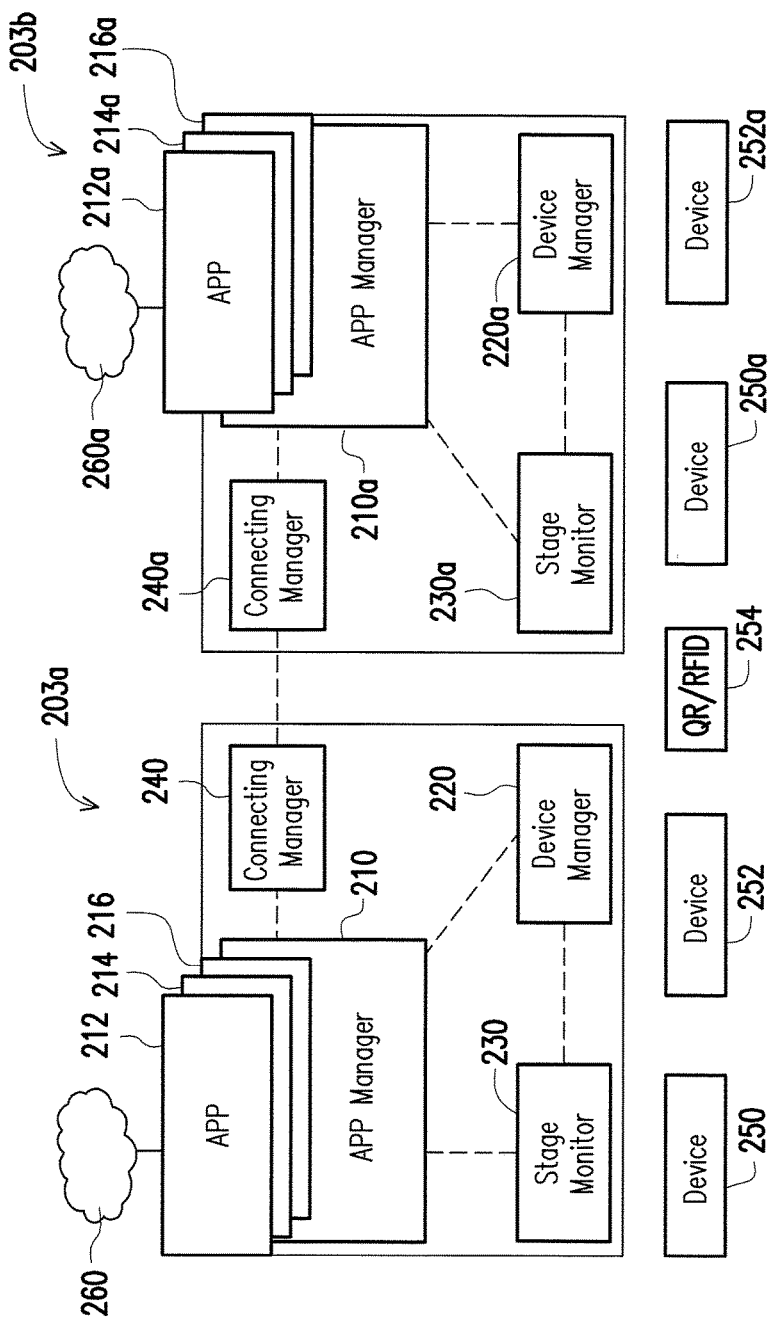
FIG. 2C is a schematic block diagram of transmitting profiles of different applications between two gateways in the system for automatically managing applications on digital convergence gateway according to one embodiment of the disclosure.

FIG. 2C is a schematic block diagram of transmitting profiles of different applications between two gateways in the system for automatically managing applications on digital convergence gateways according to one embodiment of the disclosure. In this embodiment of FIG. 2C, one of the gateways is an anchor gateway, and different APPs are installed in the anchor gateway and the profiles of the APPs are registered in the anchor gateway in the installing phase. When another gateway appears or joins as an authorized gateway, the anchor gateway may communicate with the authorized gateway and transmit the profiles of different APPs to the authorized gateway, such that the external devices connecting to or communicating with the gateways may switch between the gateways to use the APPs. In the operating phase, the gateways may manage relative APPs according to, for example, the gain values. Referring to FIG. 2C, the system for automatically managing applications in a first gateway 203*a* includes the APP manager 210, the device manager 220, the stage monitor 230, and the connecting manager 240. The first gateway 203*a* connects or communicates with the devices 250, 252, and 254. The system for automatically managing applications in a second gateway 203*b* includes a APP manager 210*a*, a device manager 220*a*, a stage monitor 230*a*, and a connecting manager 240*a*. The second gateway 203*b* connects or communicates with the devices 250*a* and 252*a*. The system for automatically managing applications in the first gateway 203*a* or in the second gateway 203*b* may be operated in, for example, the application managing device 200 in FIG. 2A. The structure and the characteristics of the application managing device 200 in FIG. 2A have been described earlier, and are not repeated here.

At the beginning of executing the applications, the first gateway 203a obtains the profiles of the registered APPs 212, 214, and 216. The first gateway 203a is the anchor gateway for the APPs 212, 214, and 216, which may be provided by, for example, the remote service provider 260. While, the second gateway 203b obtains the profiles of the registered APPs 212a, 214a, and 216a. The second gateway 203b is the anchor gateway for the APPs 212a, 214a, and 216a, which may be provided by, for example, a remote service provider 260a. According to the embodiment of the system for automatically managing applications, the first gateway 203a and the second gateway 203b may transmit profiles of different APPs to each other via a communicating channel between the connecting manager 240 of the first gateway 203a and the connecting manager 240a of the second gateway 203b. For example, the second gateway 203b is an authorized gateway for some APPs. When the second gateway 203b is going to use the APPs (for example, APPs 212, 214, and 216) registered in the first gateway 203a, the second gateway 203b calculates the gain values and transmits the gain values to the first gateway 203a, so that the first gateway 203a may determine to open or close the APPs, or determine the APPs to be executed in the second gateway 203b. In another embodiment, the APP manager 210 of the first gateway 203a may obtain the UVs, the CVs, and/or the OP values of the APPs 212, 214, and 216 corresponding to the authorized gateway (the second gateway 203b) via the connecting manager 240. Then, the gain values of the APPs corresponding to the anchor gateway (the first gateway 203a) and the authorized gateway (the second gateway 203b) may be calculated, to determine the gateway having a greater gain value and is more appropriate to execute the APPs.

Figure 3A:
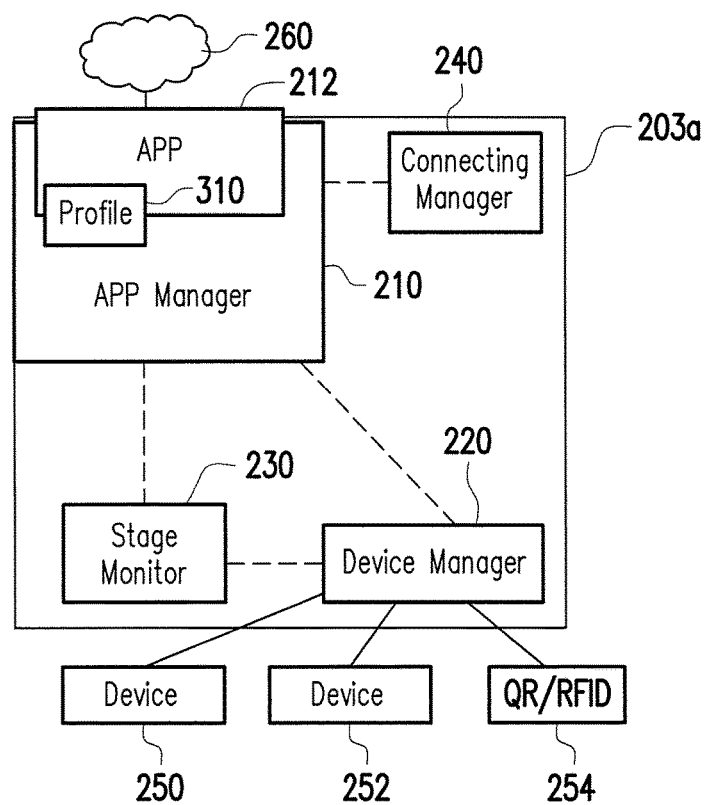
FIGS. 3A-3B are schematic diagrams describing the setting phase and the installing phase of the system for automatically managing applications on digital convergence gateways, respectively, according to one embodiment of the disclosure.
Figure 3B:
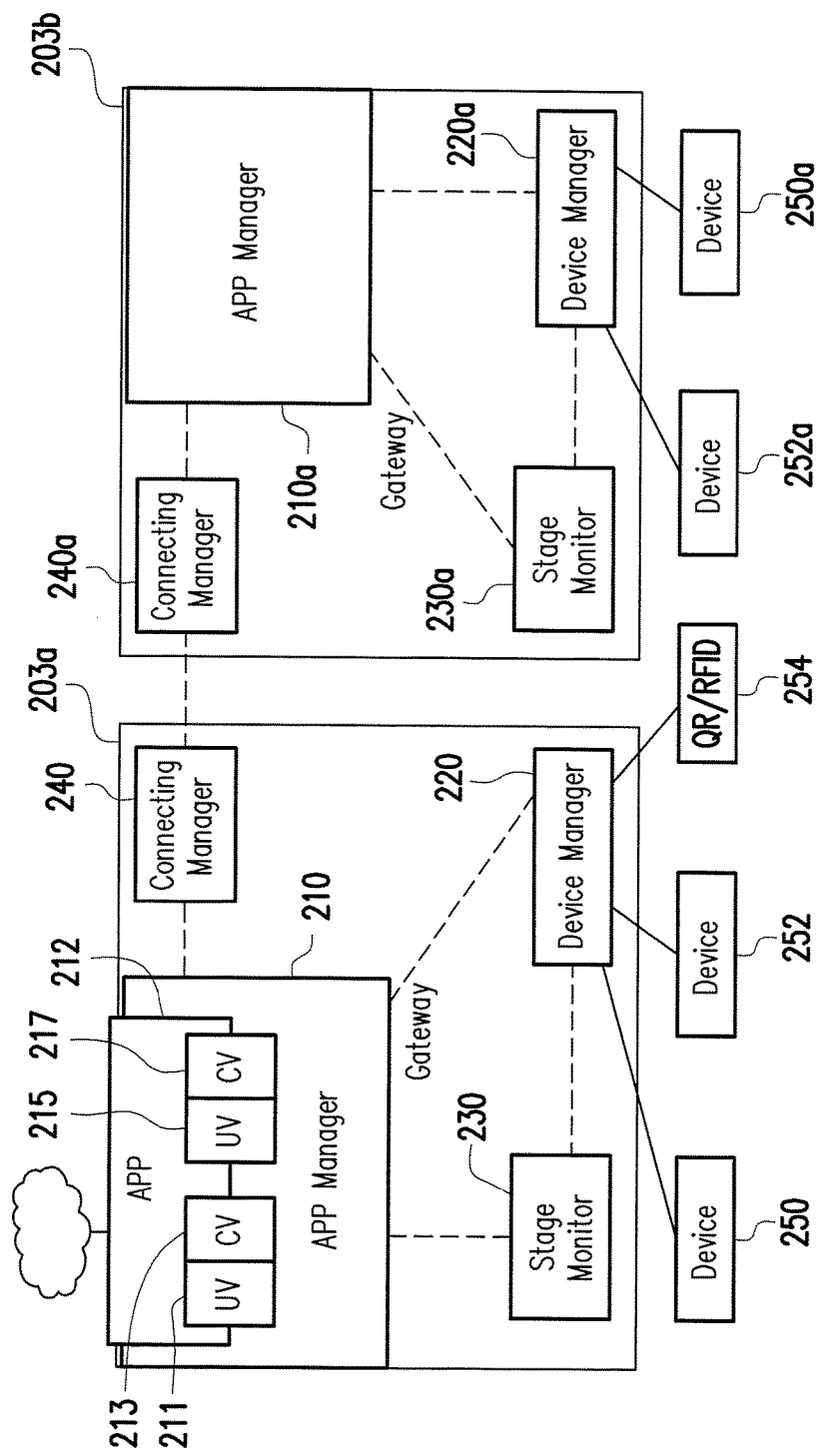

FIGS. 3A-3B are schematic diagrams describing the setting phase and the installing phase of the system for automatically managing application on digital convergence gateways, respectively, according to one embodiment of the disclosure. Referring to FIG. 3A, the first gateway 203a serves as the anchor gateway of the APP 212. Therefore, a profile 310 of the APP 212 is registered in the first gateway 203a in the installing phase. According to the profile 310, the APP manager 210 may determine to open or close the APP 212, or to determine whether the APP may be executed in the first gateway or not.

Referring to FIG. 3B, the APP manager 210 obtains the utility value (UV) and the cost value (CV) of the APP 212, after performing a calculation according to the profile 310 of the APP 212. In another embodiment, the OP value may also be obtained. Thereafter, when an authorized gateway which may execute the APP 212 is to be added, the profile 310 of the APP 212 may be transmitted to the authorized gateway via the communicating channel between the connecting manager 240 of the anchor gateway (the first gateway 203a) and the connecting manager 240a of the authorized gateway (the second gateway 203b). According to the profile 310, the APP manager 210a of the authorized gateway may determine to open or close the APP 212, or to determine whether the APP may be executed in this authorized gateway or not. In other words, every gateway may determine to open or close the APP 212 according to the profile 310 of the APP 212. Therefore, the gain values of the APP 212 executing in the anchor gateway (the first gateway 203a) and in the authorized gateway (the second gateway 203b) may be calculated, respectively, to determine which gateway has a greater executing benefit.

Figure 4:
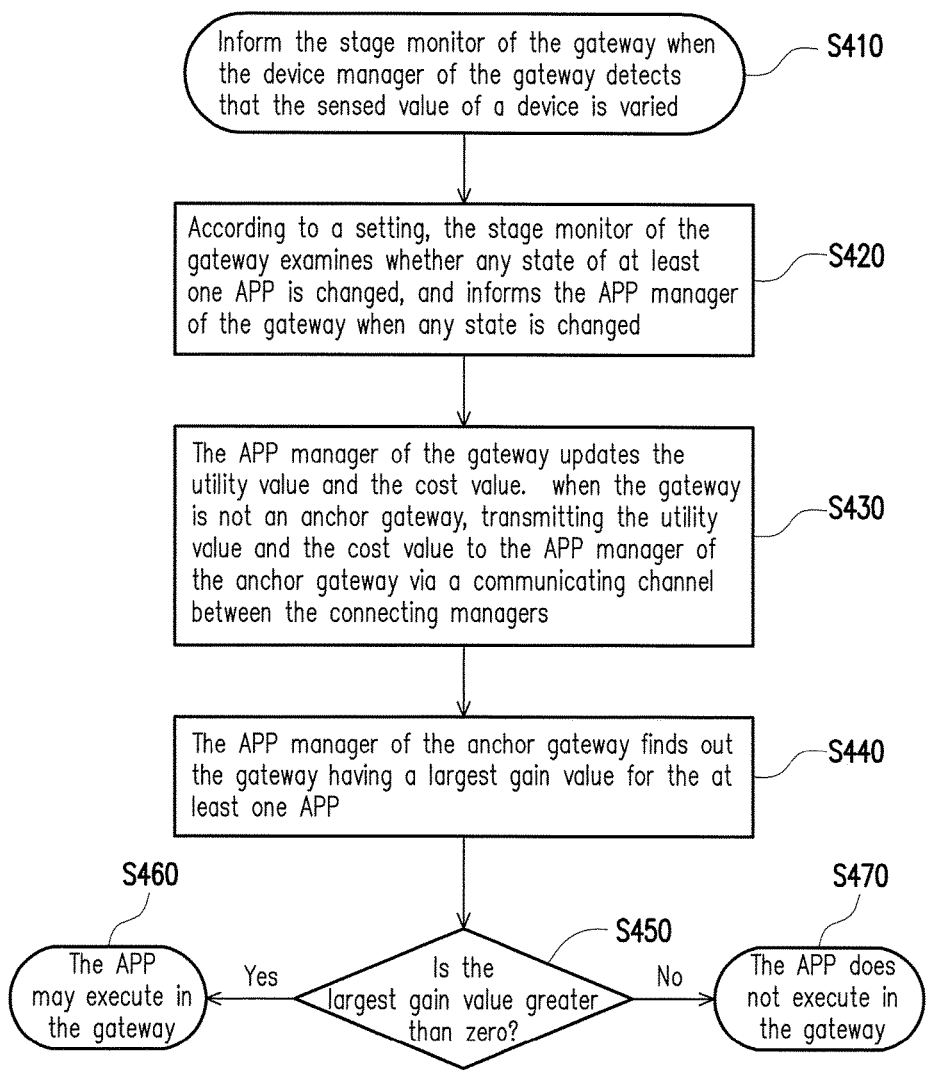
FIG. 4 shows an operation flow for automatically managing applications on digital convergence gateways according to one embodiment of the disclosure.

With appropriate reference to the above-mentioned application managing device and the system for automatically managing applications on digital convergence gateways, FIG. 4 further describes an operating flow for automatically managing applications on digital convergence gateways according to an embodiment of the disclosure. In step S410, the device manager of a gateway informs the stage monitor of the gateway when the device manager detects that the sensed value of a device is varied. In step S420, according to a setting, the stage monitor of the gateway examines whether any state of at least one APP is changed, and informs the APP manager of the gateway when any state of the at least one APP is changed. In step S430, the APP manager of the gateway updates the utility value and the cost value of the at least one APP. When the gateway is not an anchor gateway, the gateway transmits the utility value and the cost value to the APP manager of the anchor gateway via a communicating channel between the connecting manager of the gateway and the connecting manager of the anchor gateway. In step S440, according to the updated information of the gain value, the APP manager of the anchor gateway finds out the gateway having a largest gain value for the at least one APP. Then, in step S450, the APP manager of the anchor gateway determines whether the largest gain value is greater than zero. In another embodiment, whether the largest gain value is greater than a predetermined value or a threshold value may be used for, but not limited to determining the execution of the APP in this step. When the largest gain value is greater than zero (S450, yes), step S460 is performed. In step S460, the at least one APP may be executed in the gateway having the largest gain value for the at least one APP. When the largest gain value is not greater than zero (S450, no), step S470 is performed. In step S470, the at least one APP is not executed.

Accordingly, an exemplary embodiment related to the method for automatically managing applications on digital convergence gateways may comprise: installing at least one application in a gateway, wherein the gateway is an anchor gateway and the at least one application corresponds to a profile; generating, by the anchor gateway, a gain value of the at least one application according to the profile; determining, according to the gain value, whether to open or close the at least one application, or whether the at least one application to be executed in the anchor gateway or in an another gateway.

With appropriate reference to the above-mentioned application managing device, the method and the system for automatically managing applications on digital convergence gateways, the followings describe three exemplary operating flows for managing applications on digital convergence gateways.

Figure 5A:
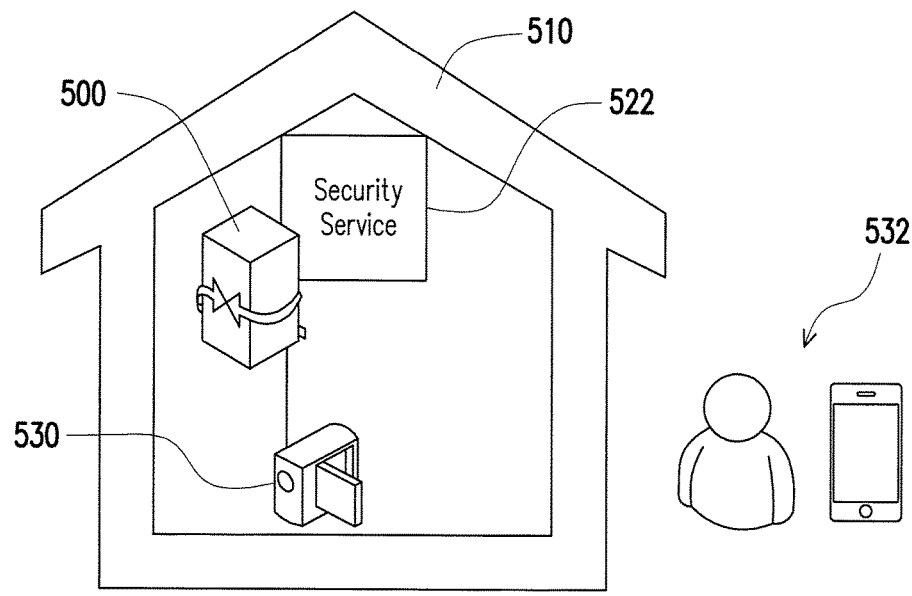
FIGS. 5A-5C show an operating flow of a system for automatically managing applications, which is applied in managing digital convergence applications of the home security according to an exemplary embodiment of the disclosure.
Figure 5B:
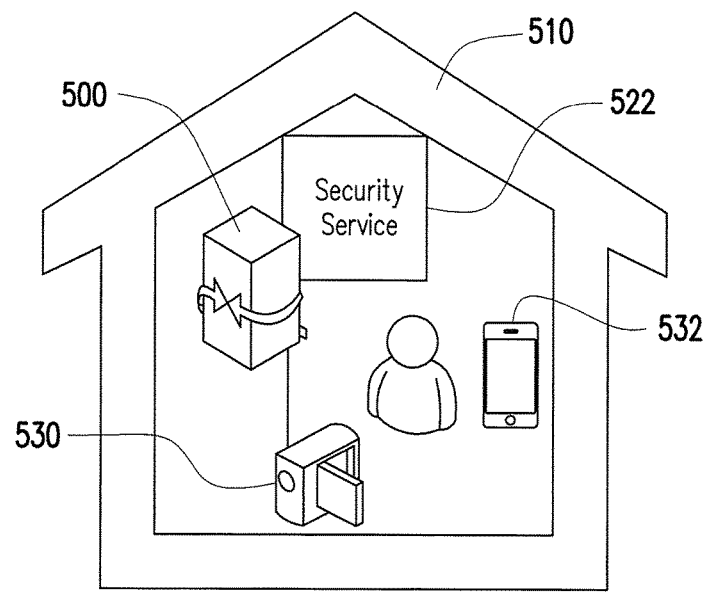
Figure 5C:
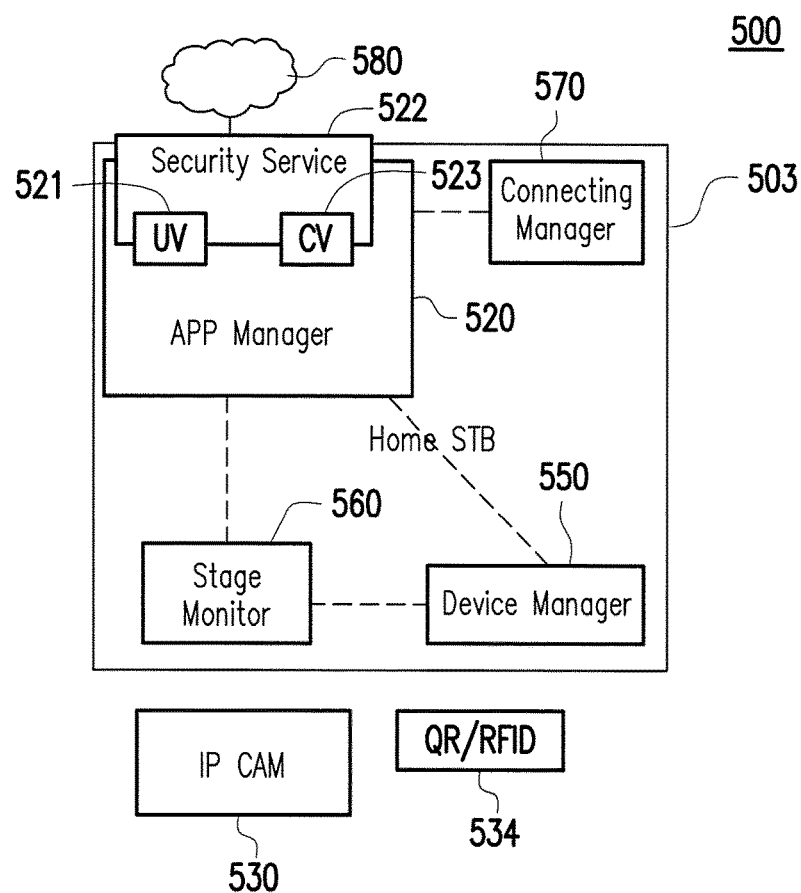

FIGS. 5A-5C show an operating flow of the system for automatically managing applications, which is applied in managing digital convergence applications of the home security according to an exemplary embodiment of the disclosure. FIG. 5A shows a situation that no one is at home 510 or the user 532 is not at home 510. In this situation, a security service application 522 in the home STB 500 is opened and executed. FIG. 5B is a situation that the user 532 is at home 510 or comes back home 510. Firstly, a profile of the security service application 522 may be set as follows, according to different execution states. The utility value may be calculated, for example, according to equation (1). Since the security service application 522 is executed only in the home STB, therefore, the home STB is the anchor gateway and there is no authorized gateway. Function X1(S) is set to 1 when there is no other mobile gateway at home 510 while function X1(S) is set to 0 when there is at least one other mobile gateway at home 510. Function X2(D) is set to 1 when there is an IP camera (CAM) while function X2(D) is set to 0 when there is no IP CAM, which indicates the IP CAM is needed for executing the security service application 522. K1 is set to 80, and K2(D) is set to 0.

FIG. 5C shows a system for automatically managing applications 503, adapted to the home STB 500 according to this embodiment. The system for automatically managing applications 503 adapted to the home STB 500 may include an APP manager 520, a device manager 550, a stage monitor 560, and a connecting manager 570. The home STB 500 including the system for automatically managing applications 503 may connect to different devices (for example, IP CAM 530, device 534, etc.) via any wired or wireless schemes. The connecting schemes may be, but not limited to QR code, RFID, NFC, Wi-Fi, Bluetooth, UWB, 3G, 4G, ZigBee. The home STB 500 may also connect to a remote service provider 580 that may provide the security service application 522.

As may be seen from FIG. 5A and FIG. 5C, when no one is at home 510, the APP manager 520 of the home STB 500 may obtain the utility value (UV) 521 and the cost value (CV) 523 according to the profile (including the utility value and the cost value, and the calculation of these two values have been described as aforementioned) of the security service application 522. Therefore, the gain value (60) is obtained by subtracting the cost value from the utility value, assuming that the cost value and the utility value are 20 and 80, respectively, after the calculation. Since the gain value (60) is greater than zero, the security service application 522 may be opened and executed.

As may be seen from FIG. 5B and FIG. 5C, when the user 532 comes back home 510, the stage monitor 560 detects a mobile gateway (that is, the gateway carried by the user 532) appearing in the same network and reports this condition to the APP manager 520. Thereafter, the APP manager 520 modifies the utility value to 0, and the cost value remains unchanged (that is, 20). Accordingly, the gain value of a negative value (−20) is obtained, which indicates to close the security service application 522. Therefore, the home STB 500 closes the security service application 522 automatically. In the exemplar, Equation (1) may be adopted to calculate the utility value. In this situation, X1(S) is 0, which indicates that the security service application 522 is not executed. In this situation, X2(D) is 1, which indicates that it is appropriate to execute the security service application 522. In other words, when the user 532 comes back home, the execution of the security service application 522 is no longer required, which indicates that X1(S) is 0, therefore, the utility value is 0 according to the equation (1).

As may be seen from the foregoing description of FIG. 5A to FIG. 5C, the operating flow is followed as described in the FIG. 4. That is, the operating flow includes informing the stage monitor 560 when the device manager 550 detects that the sensed value of the device is varied; according to the setting of the profile of the security service application 522, the stage monitor 560 examining whether any state of the security service application 522 is changed, and informing the APP manager 520 when the state of the security service application 522 is changed; the APP manager 520 updating the utility value and the cost value of the security service application 522; the APP manager 520 making a determination directly, because the home STB 500 is the anchor gateway; and the APP manager 520 of the anchor gateway determining whether the gain value is greater than zero, to determine whether to open or close the security service application 522 automatically.

In addition, when all of the family members have left home, the stage monitor 560 may detect that the mobile gateway carried by the user 532 has left the network, and report this condition to the APP manager 520. Then, the APP manager 520 may modify the utility value to 80 while the cost value remains unchanged. The APP manager 520 may also determine that the gain value is positive and open the security service application 522.

Since the executing gateway is the anchor gateway (the home STB 500), the steps S410-S450 in FIG. 4 are performed by the home STB 500. While the step S430 of transmitting the utility value and the cost value to the APP manager of the anchor gateway via a communication channel between the connecting managers of the gateway and the connecting managers of the anchor gateway, is not required. This is another embodiment of the disclosure.

Figure 6A:
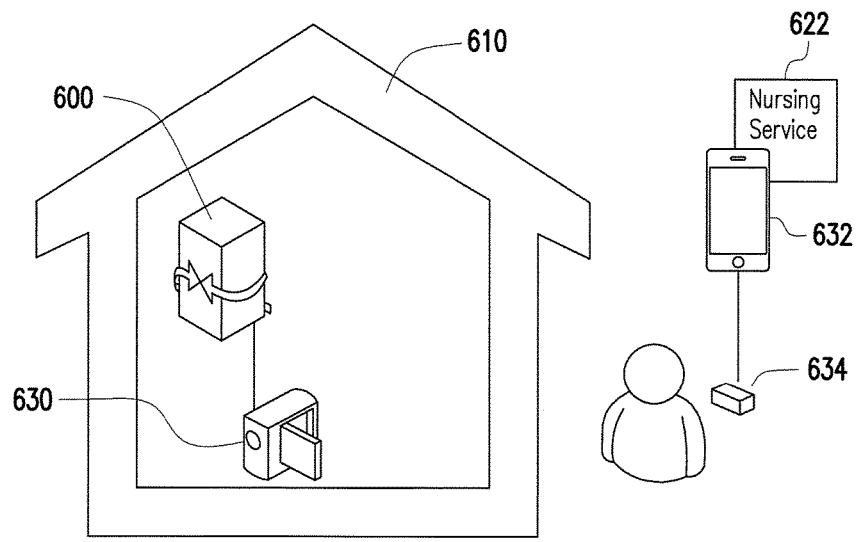
FIGS. 6A-6D show an operating flow of a system for automatically managing applications, which is applied in managing digital convergence applications relative to the medical care according to one embodiment of the disclosure.
Figure 6B:
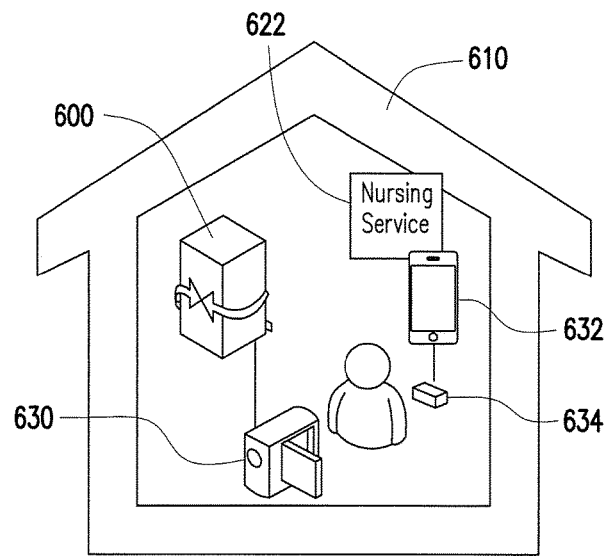

FIGS. 6A-6D show another operating flow of the system for automatically managing applications, which is applied in managing digital convergence applications relative to the medical care according to an exemplary embodiment of the disclosure. Since a nursing care application is focusing on the user, assume that the anchor gateway is the cell phone and the authorized gateway is the home STB, and the user wears a wearable heart rate measuring device. FIG. 6A shows that the user is not at home. In this situation, there is no connection between a cell phone 632 and the home STB 600. Since the cell phone 632 disconnects with the home STB 600, the APP manager of the anchor gateway (that is, the cell phone 632) determines that the cell phone 632 is the gateway having a largest gain value. Therefore, the APP manager of the anchor gateway switches the nursing care application to the cell phone 632 to execute. FIG. 6B shows that the user comes back home. In this situation, the cell phone 632 connects the home STB 600. Since the home STB 600 is the authorized gateway of the nursing care application, the home STB 600 transmits the utility value and the cost value of the nursing care application to the cell phone 632 (that is, the anchor gateway). The cell phone 632 finds out that the gain value of the home STB 600 is greater than that of the cell phone 632 for executing the nursing care application. Therefore, the cell phone 632 switches the nursing care application to the home STB 600 to execute. The following describes the detailed with reference to the accompanying figures.

Firstly, the profile of the nursing care application may be set as follows according to different execution states. The utility value may be calculated, for example, by using the equation (1). The cell phone is the anchor gateway, and the home STB is the authorized gateway. Therefore, when the cell phone connects the home STB, the nursing care application may be executed by the home STB. X1(S) is set to 1 because the nursing care application needs to be executed all the time. Connecting a heart rate measuring device is a requirement, therefore, X2(D) is set to 1. K1 is set to 50. K2(D) is set to 20 when there is an IP CAM, which indicates that a gateway should have a greater utility value when the IP CAM connects the gateway.

Figure 6C:
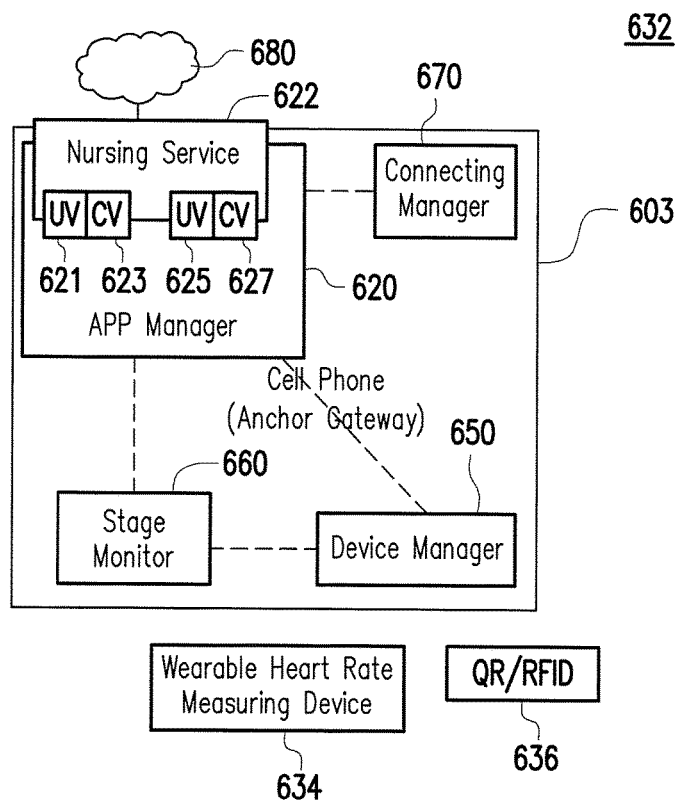

FIG. 6C shows a system for automatically managing applications 603, adapted to the cell phone 632 according to this embodiment. The system for automatically managing applications 603 adapted to the cell phone 632 may include an APP manager 620, a device manager 650, a stage monitor 660, and a connecting manager 670. The cell phone 632 including the system for automatically managing applications 603 may connect to different devices (for example, a wearable heart rate measuring device 634 or a device 636) via any wired or wireless schemes such as QR code, radio-frequency identification (RFID), or near field communication (NFC). Being as the anchor gateway for the nursing care application, the cell phone 632 generates a utility value (UV) 621 and a cost value (CV) 623 of the nursing care application. According to the UV 621 and the CV 623, whether to open or close the nursing care application may be determined. When there is any authorized gateway (for example, the home STB) which may execute the nursing care application, the authorized gateway generates another UV 625 and another CV 627 of the nursing care application and transmits the UV 625 and the CV 627 to an APP manager 650 of the cell phone 632 via the connecting manager 670. The APP manager 650 of the cell phone 632 determines a gateway (for example, the anchor gateway or one of the authorized gateways) having the largest gain value to execute the nursing care application, and determines the gateway to execute the nursing care application.

Figure 6D:
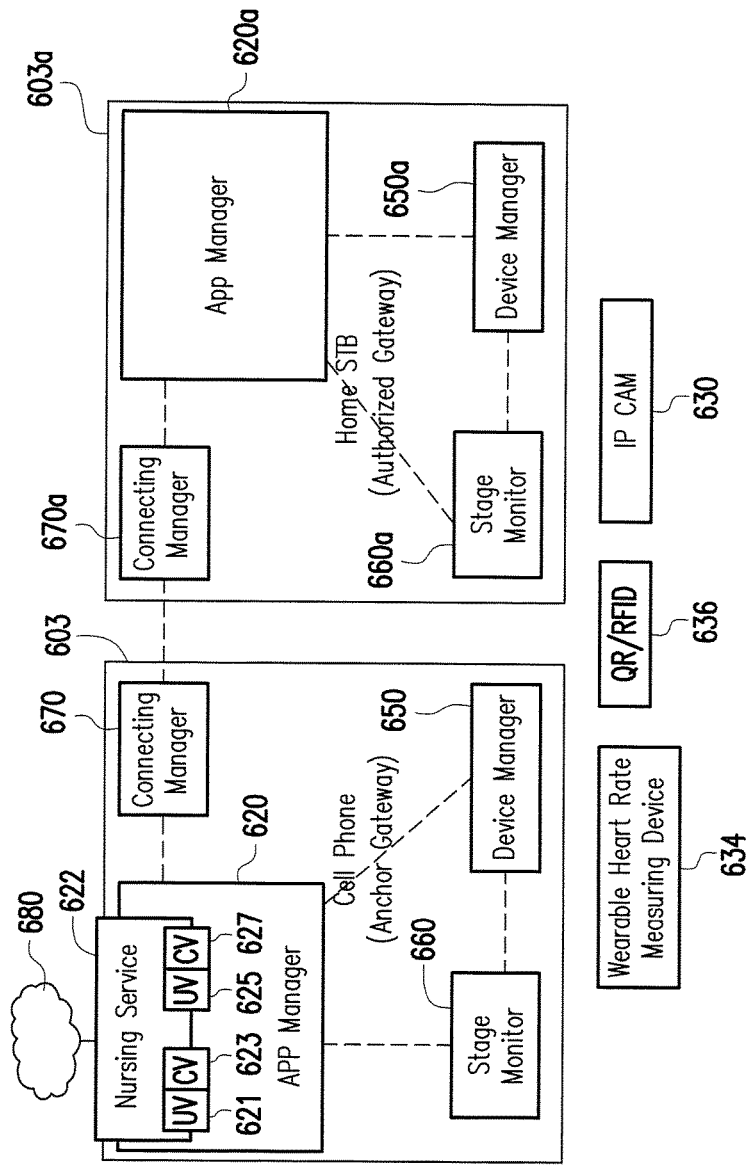

As shown in FIG. 6D, when the user comes back home 610, the cell phone 632 connects the home STB 600. The home STB 600 activates a system for automatically managing applications 603a. The system for automatically managing applications 603a may include an APP manager 620a, a device manager 650a, a stage monitor 660a, and a connecting manager 670a. Since the cell phone 632 is the anchor gateway, the home STB 600 (as an authorized gateway) generates a corresponding UV, a corresponding CV, and/or a corresponding OP value of the nursing care application accordingly, and transmits the corresponding UV, the corresponding CV, and/or the corresponding OP value to the cell phone 632 to be the UV 625, the CV 627, and/or the OP value (not shown) of the nursing care application of the authorized gateway. Therefore, the anchor gateway (the cell phone 632) may calculate the gain value of the nursing care application of the anchor gateway (the cell phone 632) and that of the nursing care application of the authorized gateway (the home STB 600) respectively, so as to determine a gateway having a greater gain value and being more appropriate to execute the nursing care application. The anchor gateway (the cell phone 632) finds out that the gain value of the nursing care application in the home STB is greater, therefore, switches the nursing care application to the home STB to execute the nursing care application.

When the user goes out, the cell phone 632 does not connect the home STB 600, as shown in FIG. 6A, therefore, the cell phone 632 becomes the gateway having a largest gain value. The APP manager 620 finds out that the gateway having the largest gain value is the cell phone 632, and switches the nursing care application to the cell phone 632 to execute the nursing care application.

FIGS. 7A-7D show an operating flow of a system for automatically managing applications, which is applied in managing digital convergence applications relative to the museum guiding according to an exemplary embodiment of the disclosure.

In this embodiment, a profile of a museum guiding application may be set as follows according to different execution states. A museum gateway is the anchor gateway, and any of cell phones may be an authorized gateway. When a gateway is at a guiding location, X1(S) is set to 1, otherwise, X1(S) is set to 0. X2(D) is set to 1 for a mobile gateway, otherwise, X2(D) is set to 0. K1 is set to 60. K2(D) is set to 0.

Figure 7A:
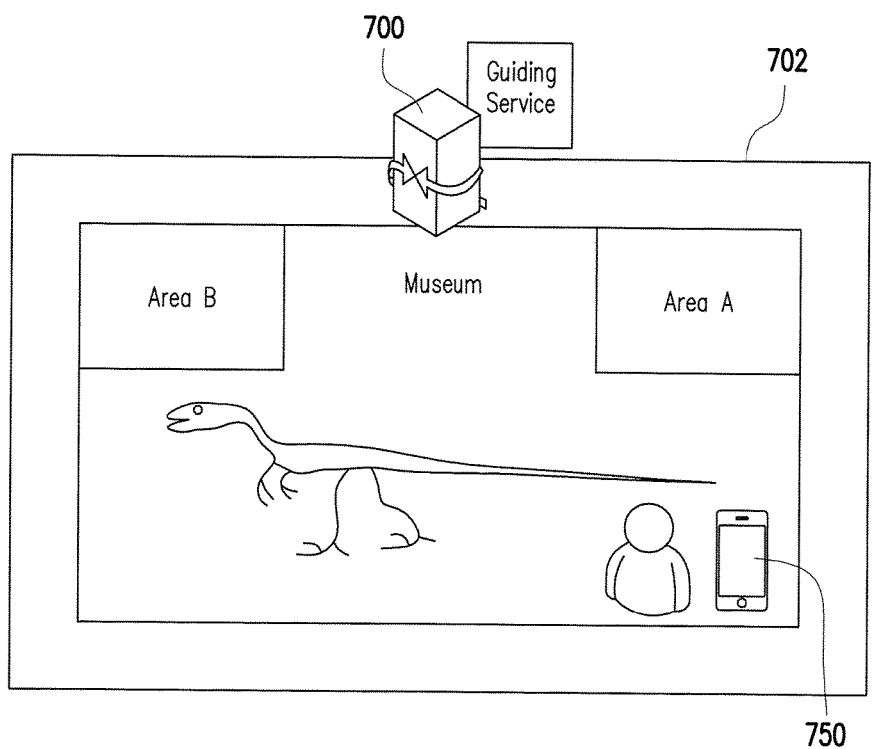
FIGS. 7A-7D show an operating flow of a system for automatically managing applications, which is applied in managing digital convergence applications relative to the museum guiding according to one embodiment of the disclosure.
Figure 7B:
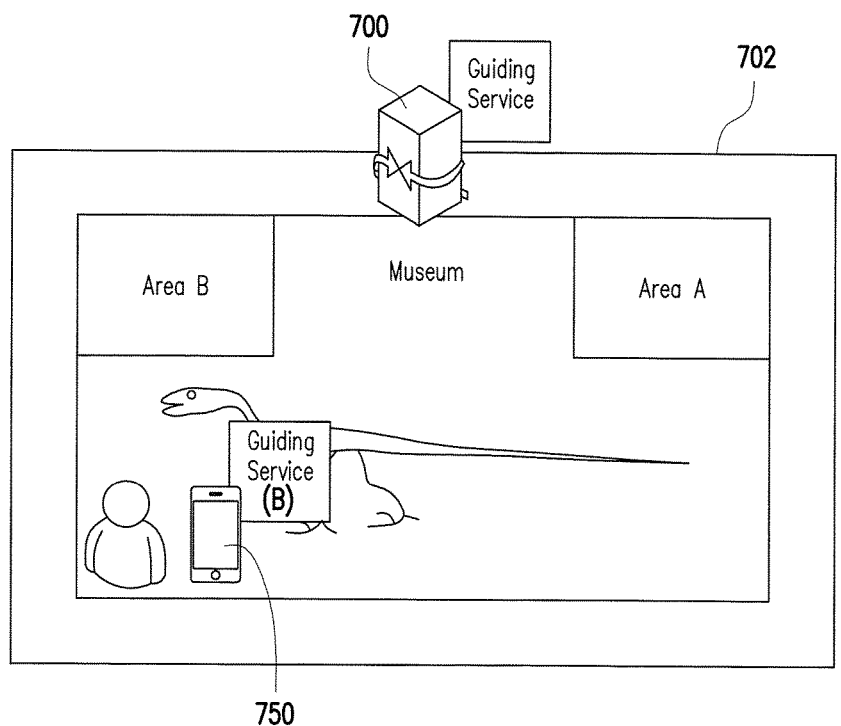

FIGS. 7A and 7B show the guiding service applications of the museum, wherein a system device 700 in a museum 702 is the anchor gateway, and a plurality of applications are installed in the system device 700. This indicates that the system device 700 may obtain a plurality of profiles, and may obtain different utility values of different applications via the calculation. The plurality of profiles contains the settings of the utility values and the cost values of different applications. When a user enters the museum 702, a cell phone 750 of the user is configured as the authorized gateway of a guiding service application, and the cell phone 750 obtains the profile of the guiding service application for each area of the museum 702. When the user moves in the interior of the museum 702, the cell phone 750 may report different utility values and different cost values of the guiding service applications for different areas according to the locations. After the APP manager of the anchor gateway in the museum 702 calculates the gain value (In this embodiment, the gain value is the cost value subtracted from the utility value.), the APP manager opens the guiding service application to be executed for the cell phone 750 of the user, wherein the gain value of the guiding service in the guiding area is greater than zero. The museum 702, for example, may be divide into an area A and an area B. Different guiding service applications are provided for the two areas, respectively. As shown in FIG. 7A, when the user enters the area A, the guiding service application for the area A is executed in the cell phone 750 of the user automatically. As shown in FIG. 7B, when the user enters the area B, the guiding service application for the area B is executed in the cell phone 750 of the user automatically. The guiding service application may be used as, but not limited to an example in this embodiment.

Figure 7C:
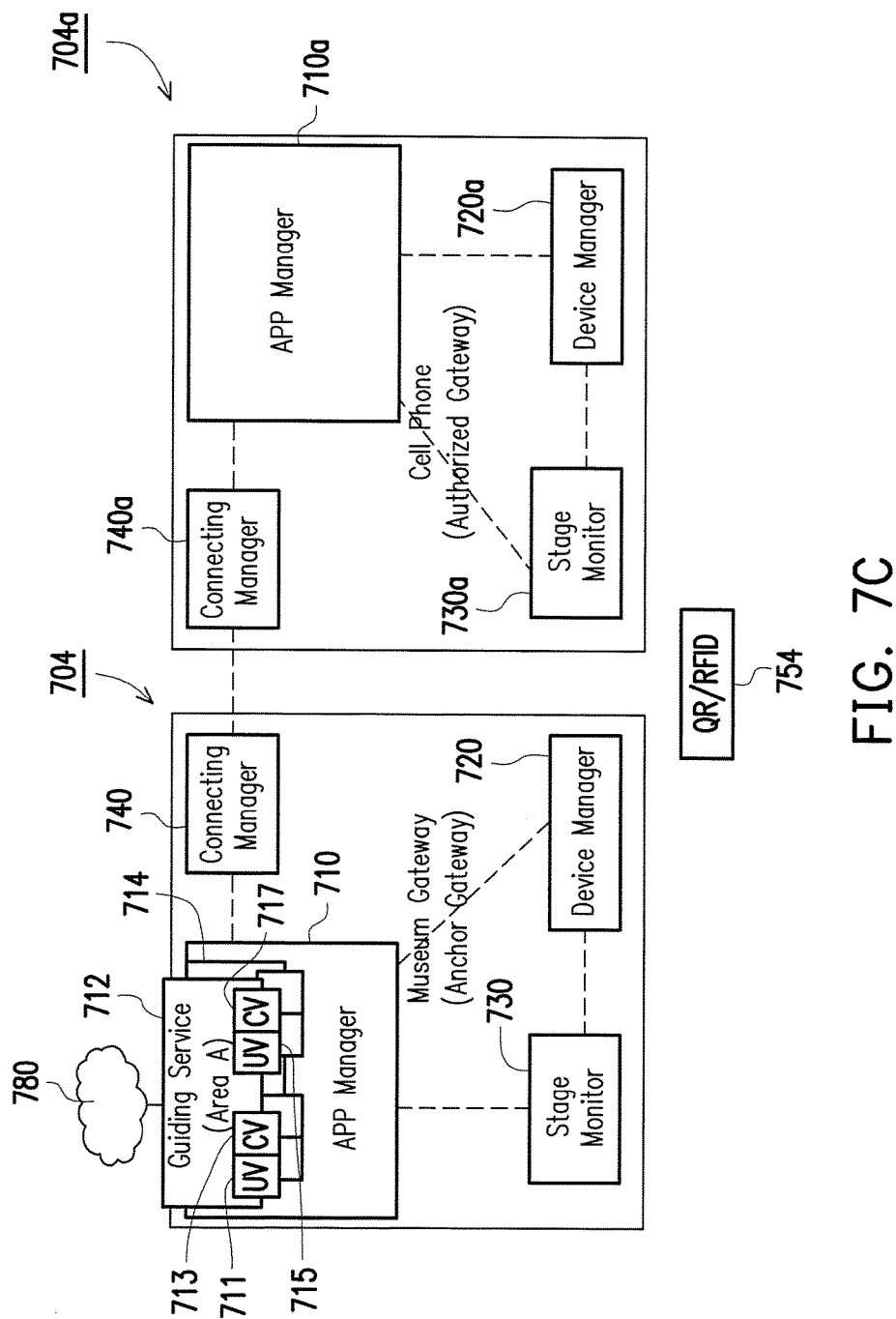
Figure 7D:
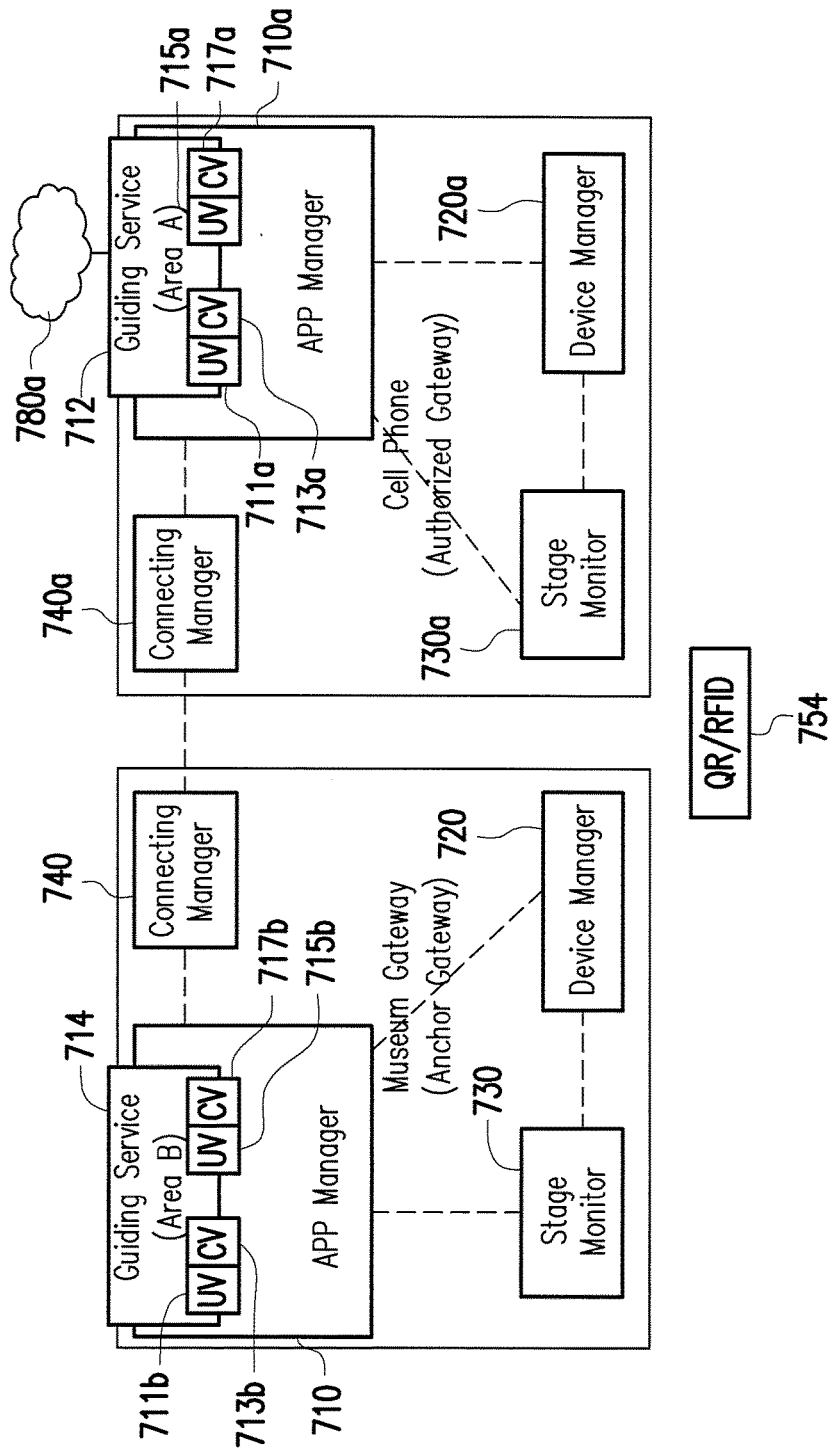

FIGS. 7C and 7D show the operating flow of a system for automatically managing applications applied in managing digital convergence applications adapted to the system device 700, according to one embodiment. Referring to FIG. 7C, a system for automatically managing applications 704 in the anchor gateway (the museum gateway) may include an APP manager 710, a device manager 720, a stage monitor 730, and a connecting manager 740. The system device 700 including the system for automatically managing applications 704 may connect different devices via any wired or wireless scheme, for example, connect a device 754 via QR code, RFID, NFC, etc., which is not to limit the disclosure. The system device 700 may connect a remote service provider 780 via a wired or wireless network. A system for automatically managing applications 704a in the authorized gateway (the cell phone of the user) may include an APP manager 710a, a device manager 720a, a stage monitor 730a, and a connecting manager 740a.

FIGS. 7C and 7C also show the operating flow of obtaining the guiding service applications sequentially when a user carrying the cell phone 750 enters the area A and the area B of museum 702, respectively. As shown in FIG. 7C, when the user carrying the cell phone 750 enters the area A in the museum, the APP manager 710a of the cell phone 750 (that is, the authorized gateway) may communicate with the connecting manager 740 of the anchor gateway (that is, the museum gateway) via the connecting manager 740a and obtain information relative to the guiding service application. Since the cell phone 750 is inside the area A, the device manager 720 of the museum gateway detects that the sensed value of a device is varied and informs the stage monitor 730. Then, according to the setting of the profile for the guiding service application, the stage monitor 730 determines that the state of the guiding service application is changed and informs the APP manager 710. The APP manager 710 updates the utility value and the cost value. On the other hand, because the cell phone 750 is inside the area A in the museum 702, the device manager 720a detects that the sensed value of the device is varied and informs the stage monitor 730a. According to the setting, the stage monitor 730a determines that the state of the guiding service application is changed and informs the APP manager 710a. The APP manager 710a updates the utility value and the cost value, and transmits the utility value and the cost value to the APP manager 710 of the museum gateway via the connecting manager 740a. According to the utility value and the cost value transmitted from the cell phone 750, the APP manager 710 of the museum gateway determines whether the gain value is greater than zero or not, so as to determine whether to open the guiding service application by the cell phone 750 or not.

In this embodiment, a utility value (UV) 711 of a guiding service application 712 for the area A of the museum gateway is 0, a cost value (CV) 713 is 20, so the gain value is −20. Before the user carrying the cell phone 750 enters the area A, a UV 715 of the guiding service application 712 for the area A of the cell phone 750 is 0, and a CV 717 is 20. After the user carrying the cell phone 750 enters the area A, the UV 715 of the guiding service application 712 for the area A of the cell phone 750 is updated to 60, and the CV 717 remains 20, so the gain value is 40. The APP manager 710 of the museum gateway determines that the gain value of the guiding service application 712 for the area A of the cell phone 750 is greater than 0, therefore, the APP manager 710 determines that the cell phone 750 opens the guiding service application for the area A. In different embodiments, the APP manager 710 of the museum gateway (that is, the anchor gateway) may generate different utility values and different cost values for different applications (for example, the guiding service application 712 and the guiding service application 714 in FIG. 7C).

As shown in FIG. 7D, before the user carrying the cell phone 750 enters the area B from the area A in the museum 702, the UV 711a of the guiding service application 712 for the area A of the museum gateway is 0, and the CV 713a is 20. The UV 715a of the guiding service application 712 for the area A of the cell phone 750 is 60, and the CV 717a is 20, so the gain value is 40. In addition, the cell phone is executing the guiding service application 712 for the area A.

When the user carrying the cell phone 750 enters the area B in the museum 702, the device manage 720 of the museum gateway is aware of the cell phone 750 and informs the stage monitor 730. Then, according to the setting, the stage monitor 730 determines that the state of the guiding service application is changed and informs the APP manager 710. On the other hand, because the user carrying the cell phone 750 enters the area B in the museum 702, the device manager 720a detects that the sensed value of a device is varied and informs the stage monitor 730a. According to the setting, the stage monitor 730a determines that the state of the guiding service application is changed and informs the APP manager 710a. The APP manager 710a updates the utility value and the cost value, and transmits the utility value and the cost value to the APP manager 710 of the museum gateway via the connecting manager 740a. According to the utility value and the cost value transmitted from the cell phone 750, the APP manager 710 of the museum gateway determines whether the gain value is greater than zero or not, so as to determine whether to open the guiding service application for the area B by the cell phone 750 or not.

In this embodiment, the UV 711a of the guiding service application 712 for the area A of the museum gateway is 0 and the CV 713a is 20, so the gain value is −20. The UV 715a of the guiding service application 712 for the area A of the cell phone 750 is 0 and the CV 717a is 20, so the gain value is −20. The UV 711b of the guiding service application 714 for the area B of the museum gateway is 0 and the CV 713b is 20, so the gain value is −20. The UV 715b of the guiding service application 712 for the area B of the cell phone 750 is 60 and the CV 717b is 20, so the gain value is 40. The museum gateway determines that the gain value is greater than 0 in the case that the cell phone 750 open the guiding service application 712 for the area B. Therefore, the museum gateway determines that the cell phone 750 of the user closes the guiding service application 712 for the area A and that the cell phone 750 opens the guiding service application 714 for the area B.

According to the application managing device, the system and the method for automatically managing applications on digital convergence gateways provided in embodiments of the disclosure, the cooperation and the communication between gateways are considered, therefore, the demands of the digital home automation are met. In the application managing device, the method and the system, according to different conditions, at least one application is opened or closed, and/or transferred between gateways automatically. By managing the applications, the gateways may communicate and cooperate with each other, therefore the execution benefit is improved, the cost is lowered, and the trend of the digital home automation may be accomplished.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A method for automatically managing applications on digital convergence gateways, the method comprising:
    installing at least one application in a gateway, wherein the gateway is an anchor gateway and the at least one application corresponds to a profile which is used by the anchor gateway to manage the at least one application and comprises information for generating a gain value;
    generating, by the anchor gateway, the gain value of the at least one application according to the profile; and
    determining, according to the gain value, whether to open or close the at least one application, or whether the at least one application to be executed in the anchor gateway or in an another gateway.

2. The method according to claim 1, wherein the method further includes:
    obtaining a sensed value of a device of the anchor gateway;
        examining whether a state of the at least one application is changed when the sensed value of the device is varied; and
        when the state of the at least one application is changed, updating the gain value of the at least one application and determining again whether to open or close the application or whether the at least one application is executed in the anchor gateway or in the another gateway.

3. The method according to claim 1, wherein the gain value of the at least one application is generated according to any of combinations chosen from a utility value of the at least one application, a cost value of the at least one application, and an operation value of an executing environment.

4. The method according to claim 3, wherein the utility value of the at least one application is determined according to any of combinations chosen from a system condition, a number of devices connected to the anchor gateway and an authorized gateway, and whether an additional utility value is added is optional.

5. The method according to claim 3, wherein the utility value of the application is generated according to a first function and a second function, and the first function determines whether the at least one application is appropriate for a current condition, and the second function determines whether any of at least one device connected to the anchor gateway or an authorized gateway is used to execute the application or not.

6. The method according to claim 3, wherein the cost value of the at least one application is determined according to a summation of costs of a plurality of devices connecting to one or both of the anchor gateway and an authorized gateway corresponding to the at least one application, or is determined according to a summation of weighted costs of the plurality of devices connecting to the one or both of the anchor gateway and the authorized gateway corresponding to the at least one application.

7. The method according to claim 3, wherein the method further includes:
when the another gateway joins or appears in the executing environment, authorizing the another gateway as an authorized gateway;
generating, by the another gateway, an another utility value of the application and an another cost value of the application, and transmitting, by the another gateway, the another utility value of the at least one application and the another cost value of the application to the gateway;
calculating an another gain value of the application according to the another utility value of the at least one application and the another cost value of the at least one application; and
determining whether to open or close the at least one application, or whether the at least one application is executed in the gateway or the another gateway.

8. The method according to claim 7, wherein the method further includes:
obtaining an another sensed value of a device of the another gateway;
examining whether a state of the at least one application is changed when the another sensed value of the device is varied;
updating the another utility value and the another cost value of the at least one application when the state of the at least one application is changed;
transmitting the another utility value and the another cost value to the anchor gateway; and
determining again whether to open or close the at least one application, or whether the at least one application is executed in the gateway or in the another gateway.

9. The method according to claim 1, wherein installing the at least one application in the gateway further includes:
registering the profile of the at least one application in the anchor gateway;
calculating a utility value of the application and a cost value of the at least on application according to the profile of the at least one application; and generating the gain value of the at least one application according to the utility value of the at least one application and the cost value of the at least one application.

10. An application managing device for automatically managing applications on digital convergence gateways, the application managing device comprising a processor and a memory, wherein the processor is configured to execute a plurality of modules and the memory is configured to store data or information for executing the plurality of modules, wherein the plurality of modules includes:
an application (APP) manager, calculating a gain value of at least one application installed in the application managing device to determine whether to open or close the at least one application or whether the at least one application is executed in the application managing device or an another gateway, wherein the at least one application corresponds to a profile which is used by an anchor gateway to manage the at least one application and comprises information for generating the gain value;
a device manager, sensing a device connected to the application managing device to obtain a sensed value of the device; and
a stage monitor, examining whether a state of the at least one application is changed, and informing the APP manager to calculate the gain value of the at least one application when the state is changed.

11. The application managing device according to claim 10, wherein the APP manager calculates the gain value of the at least one application according to any of combinations chosen from a utility value of the at least one application, a cost value of the at least one application, and an operation value of an executing environment.

12. The application managing device according to claim 10, wherein the application managing device further includes:
a connecting manager, connecting the application managing device to the another gateway.

13. The application managing device according to claim 12, wherein the application managing device is the anchor gateway, and the another gateway is authorized as an authorized gateway, wherein the another gateway generates an another utility value of the at least one application and an another cost value of the at least one application, and transmits the another utility value of the at least one application and the another cost value of the at least one application to the anchor gateway via the connecting manager, and the anchor gateway calculates an another gain value of the at least one application according to the another utility value of the at least one application and the another cost value of the at least one application, and determines, according to one or both of the gain value and the another gain value, whether to open or close the at least one application, or whether the at least one application is executed in the anchor gateway or the another gateway.

14. The application managing device according to claim 13, wherein the stage monitor examines whether the state of the at least one application is changed, and when the state is changed, informs the APP manager to calculate one or both of the gain value and the another gain value, to determine whether to open or close the at least one application or whether the at least one application is executed in the application managing device or the another gateway.

15. A system for automatically managing applications on digital convergence gateways, adapted to a plurality of gateways, and in the system, there is an anchor gateway of the plurality of gateways, the anchor gateway comprising:

an application (APP) manager, calculating a gain value of an at least one application installed in the anchor gateway to determine whether to open or close the at least one application or to determine one of the plurality of gateways to execute the at least one application, wherein the at least one application corresponds to a profile which is used by the anchor gateway to manage the at least one application and comprises information for generating the gain value;

a device manager, sensing a device connected to the anchor gateway to obtain a sensed value of the device; and a stage monitor, examining whether a state of the at least one application is changed, and informing the APP manager to calculate the gain value of the at least one application when the state is changed.

16. The system according to claim 15, wherein the APP manager calculates the gain value of the at least one application installed in the anchor gateway according to any of combinations chosen from a utility value of the at least one application, a cost value of the at least one application, and an operation value of an executing environment.

17. The system according to claim 16, wherein the utility value of the application is determined according to any of combinations chosen from a system condition, a number of devices connected with the anchor gateway and an authorized gateway, and whether an additional utility value is added is optional.

18. The system according to claim 16, wherein the cost value of the at least one application is determined according to a summation of costs of a plurality of devices connecting to one or both of the anchor gateway and an authorized gateway of the plurality of gateways corresponding to the at least one application, or is determined according to a summation of weighted costs of the plurality of devices connecting to the one or both of the anchor gateway and the authorized gateway corresponding to the at least one application.

* * * * *